United States Patent [19]

Kawamura

[11] Patent Number: 5,000,133

[45] Date of Patent: Mar. 19, 1991

[54] TWO-CYCLE HEAT-INSULATING ENGINE

[75] Inventor: Hideo Kawamura, Samukawa, Japan

[73] Assignee: Isuzu Motors Limited, Tokyo, Japan

[21] Appl. No.: 514,473

[22] Filed: Apr. 25, 1990

[30] Foreign Application Priority Data

May 9, 1989 [JP] Japan .................................. 1-114143

[51] Int. Cl.[5] ...................... F02B 25/04; F02B 77/11; F02D 13/02
[52] U.S. Cl. .............................. 123/65 VC; 123/668; 123/90.11
[58] Field of Search ........ 123/65 VC, 65 W, 65 WA, 123/90.11, 668, 188 AA, 193 C, 41.83, 41.84

[56] References Cited

U.S. PATENT DOCUMENTS

| 3,394,686 | 7/1968 | Kreglewski et al. | 123/65 VC |
| 4,523,554 | 6/1985 | Ryu | 123/193 C |
| 4,911,109 | 3/1990 | Kawamura et al. | 123/668 |
| 4,938,179 | 7/1990 | Kawamura | 123/90.11 |
| 4,955,334 | 9/1990 | Kawamura | 123/90.11 |

FOREIGN PATENT DOCUMENTS 2134596 8/1984 United Kingdom ............. 123/90.11

Primary Examiner—Willis R. Wolfe
Assistant Examiner—Thomas Moulis
Attorney, Agent, or Firm—Browdy and Neimark

[57] ABSTRACT

In a two-cycle heat-insulating engine of the present invention, each of combustion chambers defined by the lower surface of a cylinder head and a cylinder line has an adiabatic structure, each of exhaust valves is disposed in each exhaust port formed in the cylinder head, an intake valve for preventing the backflow of an exhaust gas is disposed in each intake port formed at the lower part of a cylinder, each of these valves is actuated for opening and closing by electromagnetic force of each electromagnetic valve driving device, and a controller controls the opening/closing timing of the intake and exhaust valves, the valve opening/closing time, etc, in response to detection signals from detection means for detecting the operational conditions of the engine. Particularly when the engine is driven at a low number of revolution, the exhaust valve is opened near the lower dead point so as to exhaust all at once the exhaust gas and to suck the intake air, to limit any thermal influences on the intake air and to prevent the drop of the intake air quantity.

9 Claims, 3 Drawing Sheets

TWO-CYCLE HEAT-INSULATING ENGINE

BACKGROUND OF THE INVENTION

1. Field of the Invention

This invention relates to a two-cycle heat-insulating engine which actuates intake valves and exhaust valves for opening and closing by electromagnetic force.

2. Description of the Prior Art

Conventionally, a valve mechanism which constitutes electrically intake/exhaust valves and actuates them electrically as a valve mechanism of an internal combustion engine is disclosed, for example, in Japanese Patent Laid-Open No. 183805/1983. The valve mechanism of this internal combustion engine includes a detector for detecting the operational condition of the internal combustion engine and actuates the intake and exhaust valves on the basis of the detection signal of the detector. The detector for detecting the operational conditions of the internal combustion engine is accomplished by detecting a rotation state of a crank shaft or by detecting an acceleration opening. The operation of the intake and exhaust valves by the electrical motion means is accomplished by regulating the opening degree of the valve portions in response to the operational conditions of the internal combustion engine such as the intake state of a fuel and an exhaust state of an exploded and burnt matter.

In the operations of gasoline engines and Diesel engines in general, the cycle of the four operations, i.e., an intake stroke, a compression stroke, a combustion stroke and an exhaust stroke, is repeated. Among them, it is only the combustion stroke where power is generated and torque is applied to a crank shaft. In the other three states, rotation is effected by the force of intertia. Two kinds of systems, that is, a four-cycle engine and a two-cycle engine, exist as the operation principle of each of these strokes. Incidentally, in the two-cycle engine, the intake stroke and the exhaust stroke are effected at part of the combustion stroke and the compression stroke and one cycle is completed in the two strokes of the piston or in other words, one revolution of the crank shaft. Accordingly, since the number of combustion strokes or the number of times of explosion is twice in the two-cycle engine in comparison with the four-cycle engine, the output becomes about 1.5 times that of the four-cycle engine at the same exhaust quantity.

In a heat-insulating engine having the heat-insulating structure wherein the cylinder head and the combustion chambers defined by cylinders formed in the cylinder block are made of a heat-insulating material, a ceramic material, or the like, volume efficiency drops due to high heat generated inside each cylinder and the engine output drops. The reason is as follows. Since the cylinder head and the upper part of the cylinder have the heat-insulating structure, the upper part and wall surface of each combustion chamber attain a high temperature and fresh air sucked into the cylinder receives the heat from inside the cylinder or from the wall surface and is heated and undergoes expansion so that volume efficiency drops. Moreover, the intake air quantity sucked into the combustion chamber is reduced by 20% or more by the influences of the wall surface which is at the high temperature.

In engines having the two-cycle operation, when the exhaust port is opened and the exhaust gas is discharged through the exhaust port for air exchange, a pressure wave or a pulse wave occurs inside the cylinder and purges the exhaust gas. Accordingly, the fresh air flows into the negative pressure zone generated at the trailing stream portion of this exhaust gas from the lower part of the cylinder but since the lower part of the cylinder does not attain such a high temperature as the cylinder head, the fresh air is not much affected by the wall surface temperature at the lower part of the cylinder. This provides the advantage particularly in the heat-insulating engine in that if the fresh air is sucked from the lower part of the cylinder by effecting the two-cycle engine operation, the scavenging air quantity or the intake air quantity is not reduced.

On the other hand, the temperature of the exhaust gas in the heat-insulating engine is very high. Therefore, if the intake valves and the exhaust valves are disposed in the cylinder head and are adjacent to one another as they are in a four-cycle operation engine, the intake ports are more likely to be affected by the thermal influences of the exhaust ports and exhaust gas so that the intake air undergoes expansion due to the thermal influences and the intake air quantity drops drastically.

SUMMARY OF THE INVENTION

It is therefore an object of the present invention to provide a two-cycle heat-insulating engine which can solve the problems described above and which has the following construction. The two-cycle heat-insulating engine in accordance with the present invention is based on the technical conception that if the intake and exhaust valves are produced by a light-weight material such as a ceramic material, they can be actuated for opening and closing by electromagnetic force and can be controlled for opening and closing independently of the rotation of a crank by controlling their opening/closing timing. The two-cycle heat-insulating engine of the present invention takes into consideration the fact that if the exhaust valves are disposed in the cylinder head in a heat-insulating engine wherein each combustion chamber defined by the cylinder head and the cylinder liner has a heat-insulating structure, the lower part of the cylinder, which is spaced apart from the cylinder head, does not reach relatively a high temperature, though the cylinder head portion attains a high temperature. Therefore, the two-cycle heat-insulating engine of the present invention disposes the intake ports at the lower part of the cylinders to make the control of the two-cycle operation so as to prevent at least the drop of volume efficiency resulting from the heat-insulating structure. Furthermore, the two-cycle heat-insulating engine of the present invention disposes the intake valves at the intake ports, controls the opening/closing operation of the intake valves by electromagnetic force under the optimum valve operational conditions so as to prevent the backflow of the exhaust gas to the intake ports, and moreover minimizes the thermal influences of the exhaust gas and the high temperature wall surface on the intake air in order to prevent the drop of the intake air quantity and to obtain a high engine output.

In a heat-insulating of the type wherein each combustion chamber defined by a cylinder head and a cylinder liner fitted into each cylinder formed in a cylinder block has a heat-insulating structure, it is another object of the present invention to provide a two-cycle heat-insulating engine which includes exhaust valves disposed at exhaust ports formed in the cylinder head; intake valves disposed at intake ports formed at the lower part of the cylinders; and electromagnetic valve driving devices for actuating these valves for opening and closing.

Accordingly, this two-cycle heat-insulating engine can control the intake/exhaust valves for opening and closing independently of a crank angle by actuating the intake/exhaust valves by electromagnetic force so as to control their opening/closing timing, disposes the intake ports at the lower part of the cylinder which is spaced apart from the high temperature cylinder head in the heat-insulating engine and at which the temperature is not so much high or at which the thermal influences of the exhaust ports and exhaust gas are not much great, makes the two-cycle operation control of the engine, controls the opening and closing operation of the intake valves by the electromagnetic force, prevents the backflow of the exhaust gas into the intake ports, prevents the drop of the intake air quantity by minimizing the thermal influences of the exhaust gas and high temperature wall surface on the intake air, and makes the opening/closing control at the optimum timing so as to accomplish the excellent two-cycle operation and to obtain a high engine output.

It is still another object of the present invention to provide a two-cycle heat-insulating engine including detection means for detecting the number of revolution of the engine and a crank angle as the operational conditions of the engine, and a controller for controlling the opening/closing operation of the intake and exhaust valves in response to the detection signals from the detection means.

Therefore, in this two-cycle heat-insulating engine, the opening/closing operation of the intake and exhaust valves described above is controlled by the respective electromagnetic valve driving devices, which actuate the exhaust valves disposed in the cylinder head and the intake valves disposed at the lower part of the cylinder liners for opening and closing, in response to the detection signals from detection means for detecting the number of revolution of the engine and detection means for detecting the crank angle in accordance with the instruction from the controller. Accordingly, the exhaust valves are disposed in the cylinder head in a uniflow structure, the scavenging operation is effected by a gas flow having a predetermined direction with respect to the center line of the cylinder, engine efficiency is improved and moreover, the opening/closing operation of each valve can be controlled by the magnetic force to the optimum state in accordance with the detection signal from the detection means for detecting the stroke position of the piston, that is, the crank angle, independently of the rotation of the electromagnetic force.

Particularly at the low speed revolution of the engine in this two-cycle heat-insulating engine, the exhaust valves can be opened more retardely near to the lower dead point than at the time of the high speed revolution, and the valve opening speed can be controlled more rapidly at the low speed revolution than at the high speed revolution. Accordingly, the exhaust gas can be kept inside the combustion chamber to prevent the loss of energy of the exhaust gas, and the work done can be improved to thereby improve engine performance. Moreover, when the exhaust valve is opened at this time, the exhaust gas becomes pulse-like and is exhausted at all once to the exhaust ports of the cylinder head portion.

Furthermore, two each exhaust ports and exhaust valves are disposed in the cylinder head so as to exhaust more strongly the exhaust gas. Moreover, the negative pressure occurring in the trailing flow occurs drastically and the inflow quantity of the intake air can be increased because it is attracted by this negative pressure. In other words, since the exhaust gas can be exhausted efficiently from these two exhaust ports and then the intake air is blown under the state where it fills the negative pressure range at the trailing flow of the pulse-like wave of the exhaust gas, the flow becomes a unidirectional flow. Accordingly, even when the wall temperature at the cylinder head and cylinder upper portion is at a high temperature, the lower part of the cylinder is at a relatively low temperature, is not much affected by the thermal influences, and does not expand. Accordingly, the drop of suction efficiency is low.

In this two-cycle operation engine, the intake valves are disposed at the intake ports and their opening/closing operation is controlled by the electromagnetic force. Particularly because the intake valves can be opened after the passage of a predetermined period of time after the major proportion of the exhaust gas are exhausted by the opening of the exhaust valves, the backflow of the exhaust gas into the intake ports does not occur unlike the conventional engine in which the intake valves are opened with descension of the piston, and the drop of the intake flow rate does not occur, either.

DETAILED DESCRIPTION OF THE EMBODIMENT

Hereinafter, a preferred embodiment of the two-cycle heat-insulating engine in accordance with the present invention will be described with reference to the accompanying drawings.

Figure 1:
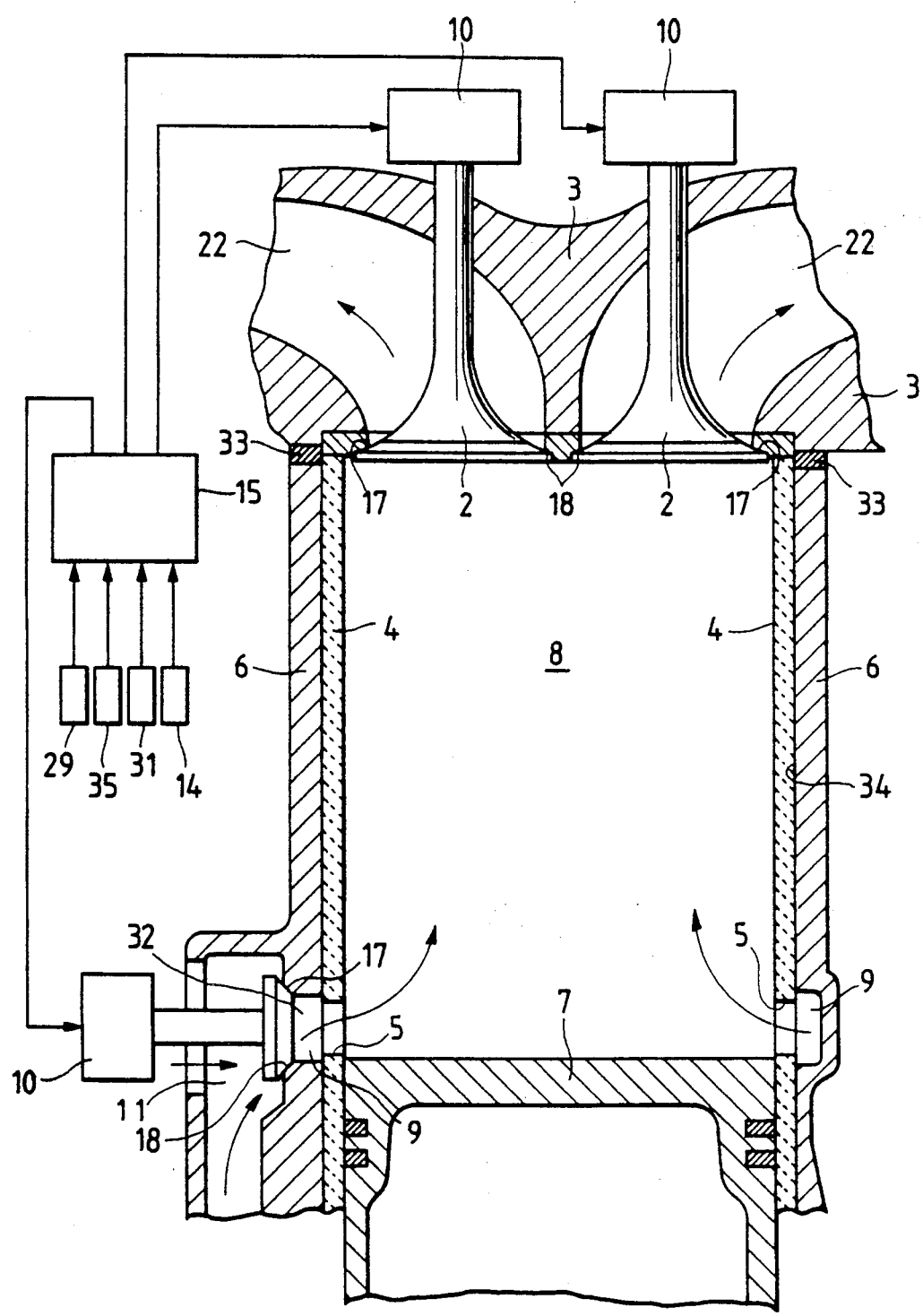
FIG. 1 is a schematic view useful for explaining a two-cycle heat-insulating engine in accordance with an embodiment of the present invention.

FIG. 1 shows an embodiment of the two-cycle heat-insulating engine of the present invention In this two-cycle heat-insulating engine, a combustion chamber 8 consisting of a cylinder head 3 and cylinder liners 4 forming cylinders is made of a heat-insulating material, a ceramic material, or the like, in a heat-insulating structure. The cylinder or a piston 7 reciprocating inside the cylinder liner 4, too, can of course be made of a heat-insulating material, a ceramic material, or the like, in the heat-insulating structure. The cylinder liner 4 is fitted to the cylinder 34 formed in the cylinder block 6 that constitutes the engine, and a cylinder head 3 is fixed to the upper surface of the cylinder block 6 through a gasket 33. The piston 7 is adapted to reciprocate in the cylinder liner 4 the combustion chamber 8 is the chamber which is encompassed and formed by the cylinder liner 4, the cylinder head 3 and the piston 7. Two exhaust ports 22 are formed in the cylinder head 3 and exhaust valves 2 are disposed in these exhaust ports 22, respectively. In other words, this two-cycle engine is of a uniflow type wherein the two exhaust valves 2 are disposed in the cylinder head 3 and scavenging is made by an air flow having a predetermined direction with respect to the center line of the cylinder so as to improve engine efficiency. Further, ring-like intake ports 9 are formed at the inner periphery at the lower part of the cylinder block 6 and a plurality of intake openings 5 are bored in the peripheral direction in such a manner as to correspond to the intake ports 9. Intake ports 11 are formed at the lower part of the cylinder block 6 in order to introduce intake air into the intake ports 9 and intake openings 32 are formed so as to communicate the intake ports 11 with the intake ports 9. A valve seat 18 is formed in each intake opening 32 and an intake valve 1 is disposed on each valve seat 18. Though only one intake valve 1 is shown disposed in the drawing, it is of course possible to define a plurality of intake ports 9 at the lower part of the cylinder block 6 and to dispose the intake valves 1 in these intake ports 9, respectively, though they are not shown in the drawing, in order to suck uniformly large quantities of intake air into the combustion chamber 8 from the peripheral direction. The intake air to be supplied into the combustion chamber 8 can of course be introduced by a compressor of a turbo-charger.

In this two-cycle heat-insulating engine, each valve 1, 2 is actuated for opening and closing by electromagnetic force. Therefore, the opening/closing timing of each valve 1, 2 can be controlled to the optimum state independently of the rotation of a crank in response to the detection signal from a position sensor 35 for detecting a stroke position of the piston or in other words, a crank angle. In other words, the intake valve 1 and exhaust valve 2 in this two-cycle heat-insulating engine are equipped with valve lifters 10 of electromagnetic valve driving devices, respectively, and are actuated for opening and closing by the electromagnetic force of the respective valve lifters 10. The valve lifter 10 of the electromagnetic valve driving device is controlled by a later-appearing controller 15 which receives detection signals from later-appearing rotation sensor 14 for detecting the number of revolution of the engine, load sensor 31 for detecting an engine load, position sensor 35 for detecting the stroke position of the piston 7 or the crank angle, and an intake air flow rate sensor 29 for detecting the intake air quantity, and generates an instruction in response to each of these detection signals.

Figure 2:
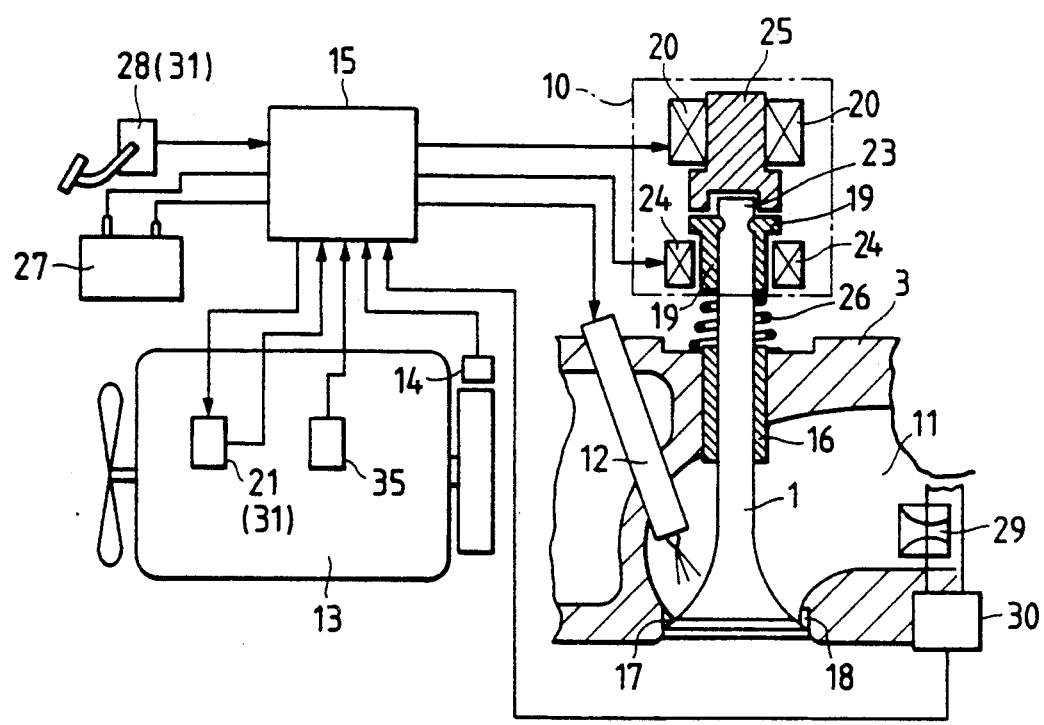
FIG. 2 is an explanatory view showing an electromagnetic valve driving device capable of being assembled in the two-cycle heat-insulating engine in accordance with the present invention.

Next, an example of the electromagnetic valve driving device capable of actuating the intake and exhaust valves for opening and closing in this two-cycle heat-insulating engine will be explained with reference to FIG. 2. As to the components of this electromagnetic valve driving device, like reference numerals will be used to identify those components which have the same function as the engine components shown in FIG. 1. In order to make the description easier, the description will be given on the structure where the intake port 11 and the intake valve 1 shown in FIG. 2 are disposed on the cylinder head 3, by way of example. However, in the two-cycle heat-insulating engine in accordance with the present invention, the intake valve 1 is disposed at the lower part of the cylinder block 6 and some design changes will of course be necessary so as to apply the intake port 11 and intake valve 1 shown in FIG. 2 to the two-cycle heat-insulating engine of this invention.

As shown in FIG. 2, this electromagnetic valve driving device is assembled into the engine 13, the principal portions of the electromagnetic driving device are taken out from the engine 13 and an injection nozzle 12, the intake air flow rate sensor 29, and the like, are shown conceptually. A fuel injection device 21 for controlling the supply fuel to the engine 13 has the injection nozzle 12, which is inserted from the upper part of the cylinder head 3 into the intake port 11 so that the fuel injected from a nozzle hole can be atomized and introduced into the cylinder. This fuel injection device 21 is controlled by the instruction from the controller 15 so as to inject a predetermined quantity of fuel. The rotation sensor 14 for detecting the number of revolution of the engine is disposed on the output shaft of the engine 13. The detection value of the number of revolution of the engine, that is, the rotation signal, is inputted to the controller 15. The intake valve 1 is made of a ceramic material, and is disposed in such a manner as to be capable of reciprocation while being guided by a valve guide 16 which is fixed to the cylinder head 3.

Though the drawing shows only the intake valve 1, the two exhaust valves 2, 2 in the two-cycle heat-insulating engine in accordance with the present invention are likewise actuated for opening and closing by the similar electromagnetic valve driving devices, respectively. In this case, the fuel injection nozzle and the flow rate sensor are not disposed, of course, in the exhaust system in which these exhaust valves 2, 2 are disposed.

The intake port 11 is opened and closed when a valve face 17 of the intake valve 1 comes into contact with and separates from the valve seat 18 disposed at the intake port 11 of the cylinder head 3 due to reciprocation of the intake valve 1. Therefore, the intake air quantity into the cylinder of the engine 13 is controlled by the opening/closing operation or opening/closing quantity of the intake valve 1. A movable element 19 made of a magnetic material such as soft iron is fixed to the upper end 23 of the intake valve 1 and a movable element coil 24 is disposed on this movable element 19. A stationary element 25 made of a magnetic material such as soft iron is disposed on the cylinder head 3 above the movable element 19 in such a manner as to face the movable element 19, and a stationary element coil 20 is disposed on the stationary element 25. Accordingly, when power is supplied/cut off to and from the movable element coil 24 and to the stationary element coil 20, the stationary element 25 attracts/separates the movable element 19, whereby the intake valve 5 is actuated to the open/closed state.

In the drawing, a valve spring 26 is shown disposed between the valve spring seat, which is formed on the upper surface of the cylinder head 3, and the movable element 19. Though the detailed disposition structure of the valve spring 26 is not shown in the drawing, this valve spring 26 may be either a tensile spring or a compression spring and its spring force has a righting action acting in the opposite direction to the electromagnetic force. Therefore, if the intake valve 1 and the exhaust valves 2, 2 are opened by the electromagnetic force of the valve lifters 10, they are closed by the spring force of the valve spring 26.

Further, as to the intake/exhaust valves which are actuated by the electromagnetic force, the material forming the intake/exhaust valves themselves is preferably a ceramic material to reduce the weight and is preferably a non-magnetic ceramic material in order to prevent attraction of iron powder or the like to the valve face 17 of the intake/exhaust valves and to the sliding portion of the valve stem. If iron powder or the like is attracted to the valve face 17 and to the sliding portion of the valve stem, the tight close state of the intake/exhaust ports by the intake/exhaust valves gets deteriorated and since frictional resistance of the sliding portion becomes great, undesirable conditions such as seizure will occur. Therefore, in order to actuate the intake/exhaust valves by the electromagnetic force, the movable element 19 made of the magnetic material is separately disposed at the upper end portion of the intake/exhaust valves. If the intake/exhaust valves are constituted in the manner described above, the stationary element 25 can separate or attract the movable element 19 against the biasing force of the spring 26 when a controlled current from the controller 15 is supplied or cut off from the movable element coil 24 and the stationary element coil 20, so that the intake valves 1 can move down or up and the valve face 17 of each intake valve 1 can open or close the intake port 11.

In this electromagnetic valve driving device, the controller 15 receives each of the detection signals detected by the load sensor 31, the rotation sensor 14 and position sensor 35, passes the current to the stationary element coil 20 and to the movable element coil 24 in the valve lifter 10 of the electromagnetic valve driving device in response to the detected load signal and can thus actuate each valve by exciting the electromagnet. The load sensor 31 of the engine 13 is for detecting the engine load and can detect it by detecting the fuel supply quantity supplied from the injection nozzle 12 of the fuel injection device 21 to the engine 13 or by detecting the step-in quantity of an acceleration pedal 28 In other words, the load sensor 31 can be constituted by a detection sensor for the fuel supply quantity to the engine and/or a detection sensor for the step-in quantity of the acceleration pedal 28. Therefore, the electromagnetic valve of each of the intake/exhaust valves can be controlled by inputting the fuel supply quantity to the engine 13 and/or the step-in quantity signal of the acceleration pedal 28 as the load signal of the engine to the controller 15. The position sensor 35 of the engine 13 is for detecting the stroke position of the piston 7 and can detect the position by detecting a crank angle. The intake air flow rate sensor 29 is disposed in the intake pipe forming each intake port 11. This intake air flow rate sensor 29 detects the air flow impinging against a heating wire through which a current flows, by the change of the resistance value of the heating wire, and the signal from this intake air flow rate sensor 29 is inputted to an intake air flow rate processor 30 and can detect the intake air flow rate flowing through each intake port 11. The intake air flow rate thus detected is inputted to the controller 15.

The controller 15 comprises a microcomputer and is equipped with a central processing unit for executing operational processing, various memories for storing the sequence of the operational processing, control means, etc, and input/output ports. When various signals are inputted from the afore-mentioned various sensors and the intake air flow rate processor 30, the controller 15 executes the processing in accordance with the sequence stored in the memory, generates a control instruction to the electromagnetic coils 20, 24 for the valve mechanism for opening and closing the intake valve 1 and the exhaust valves, and controls the opening and closing operations of these intake/exhaust valves. Besides the opening/closing operation of the intake/exhaust valves, the controller 15 operates a valve opening, a valve lift quantity, a valve timing, a valve opening time, a fuel injection timing, and the like, and generates the control instruction in accordance with the operation result. Incidentally, reference numeral 27 in the drawing represents a battery, which operates as the power source for the controller 15 and various coils for the valve mechanisms.

Figure 3:
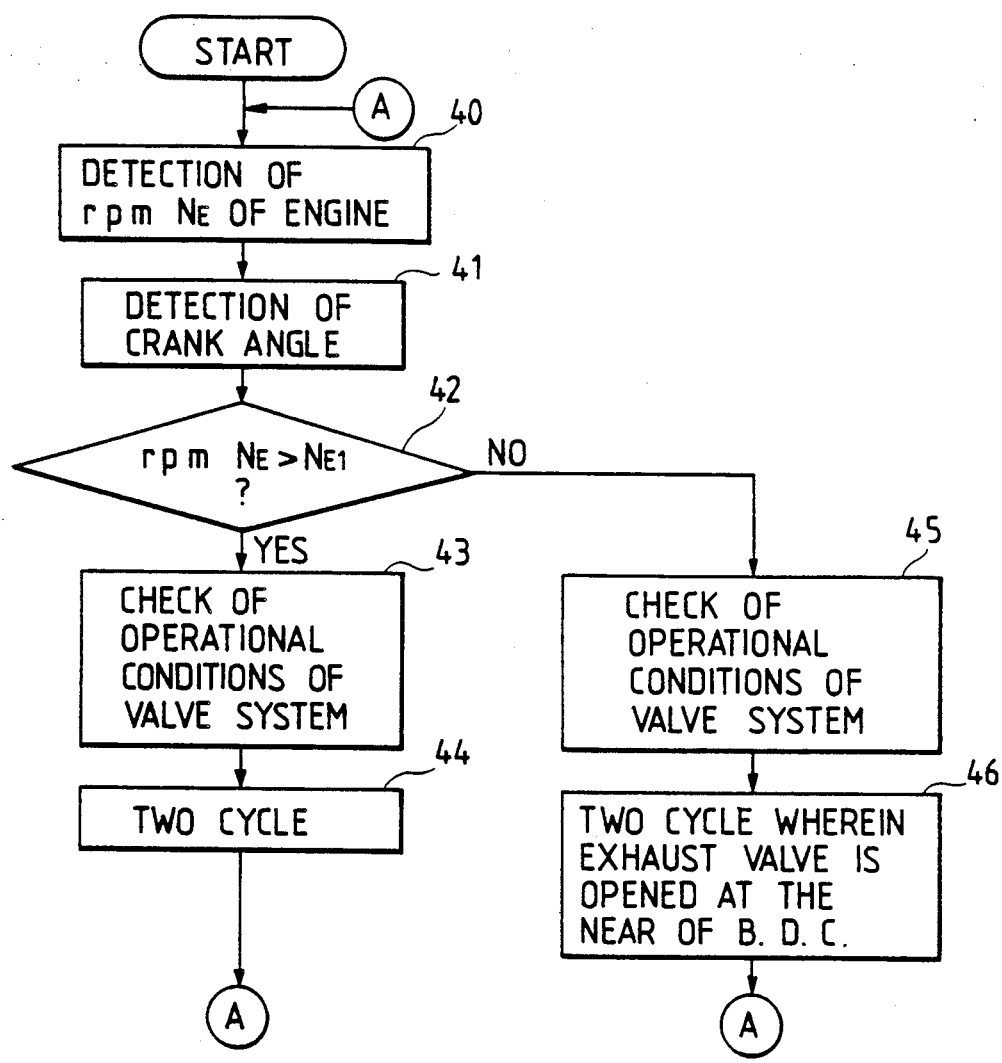
FIG. 3 is a processing flowchart showing an example of the operations of the two-cycle heat-insulating engine incorporating therein the electromagnetic valve driving device.

The electromagnetic valve driving device that can be assembled in the two-cycle heat-insulating engine in accordance with the present invention has the construction described above, and an example of the operation of this two-cycle heat-insulating engine will be explained with reference to FIGS. 1, 2 and 3. FIG. 3 is a processing flowchart showing an example of the operation of the two-cycle heat-insulating engine capable of assembling the electromagnetic valve driving device into it.

First, the operation of the valve lifters 10 of the intake valve 1 and the exhaust valves 2, 2 is controlled by the electromagnetic force by the instruction from the controller 15 in order to control the operational conditions of the valve timing, etc, of the intake valve 1 and exhaust valves 2, 2 to the optimum state. In other words, since each valve lifter 10 can be controlled independently of the rotation of the crank shaft, the control of the intake air quantity into the combustion chamber 8, the exhaust quantity and the valve timing of both valves 1, 2, 2 at the time of intake of the intake air into the combustion chamber 8 and at the time of exhaust of the exhaust gas from the combustion chamber 8 are adjusted suitably to the optimum state in accordance with the number of revolution of the engine 13 so that the engine 13 can operate excellently.

Then, the electromagnetic driving device is driven and controlled with the start of the engine 13. As the first step, the engine 13 is actuated and the number of revolution of the engine is detected by the rotation sensor 14 and this detection signal is inputted to the controller 15 (step 40).

Further, the crank angle or in other words, the stroke position of the piston 7, is detected by the position sensor 35 and this detection signal is inputted to the controller 13. The controller 13 generates an instruction to the valve lifter 10 of each of the intake valve 1 and exhaust valves 2, 2 in response to each of these detection signals, supplies the current to the stationary element coil 20 and movable element coil 24 of the valve lifter 10 of each of the intake and exhaust valves 1, 2, 2, and actuates the intake valve 1 and the exhaust valves 2, 2 for the opening and closing control (step 41).

Whether or not the number of revolution $N_E$ of the engine detected by the rotation sensor 41 is greater than a predetermined number of revolution $N_{E1}$ calculated in advance for the case where the change of the operational condition of the valves is preferred is judged. In other words, since the exhaust valves 2, 2 are preferably opened when the piston 7 is positioned near the lower dead point at the time of the low number of revolution of the engine 13, the predetermined number of revolution $N_{E1}$ is set in advance for the number of revolution of the engine 12 in order to control the valve opening timing of these valves (step 42).

When the number of revolution $N_E$ is greater than the predetermined number of revolution $N_{E1}$, the normal two-cycle operation may be conducted for the engine 13. Therefore, the valve lifter 10 of each of the intake and exhaust valves 1, 2, 2, that is, the operational condition of the valve driving system, is checked in order to make valve motion operation of the intake and exhaust valves 1, 2, 2 through the electromagnetic force of the valve lifter 10 of the electromagnetic valve driving device (step 43).

If there is no abnormality in the operational condition of the valve driving system of the intake and exhaust valves 1, 2, 2, these valves 1, 2, 2 are controlled for opening and closing at the normal valve timing by the electromagnetic force and the operation of the engine 13 is controlled to the normal two-cycle operation (step 44).

When the number of revolution $N_E$ of the engine is smaller than the predetermined number of revolution $N_{E1}$, the engine 13 is operating at the low number of revolution. Therefore, the instruction for the engine 13 is generated to each valve lifter 10 by the instruction from the controller 15 so that the exhaust valves 2, 2 are opened when the piston 7 is positioned near the lower dead point. In order to actuate the intake valve 1 and the exhaust valves 2, 2 by the electromagnetic force of the respective valve lifters 10 of the electromagnetic valve driving device, the operational conditions of the valve lifters 10 of the intake valve and exhaust valves 2, 2, that is, the operational conditions of the valve driving system, are checked (step 45).

If no abnormality is found in the operational conditions of the valve driving system of each of the intake and exhaust valves 1, 2, 2, these valves 1, 2, 2 are controlled by the electromagnetic force at the predetermined valve timing which is calculated in advance and these two exhaust valves 2, 2 are opened when the piston 7 is positioned as close as possible to the lower dead point near the end of the combustion stroke and at the start of the exhaust stroke. In this manner, the exhaust gas is kept stored in a quantity as great as possible inside the combustion chamber so as to prevent the outflow of the exhaust energy and to increase the work done. The control is then made so as to open the intake valve after the passage of a predetermined period of time (step 46).

What is claimed is:

1. A two-cycle heat-insulating engine comprising:
   a cylinder block;
   cylinder liners, each being fitted into each of cylinders formed in said cylinder block;
   a cylinder head fixed to said cylinder block;
   combustion chambers formed by said cylinder head and said cylinder liners;
   exhaust ports formed in said cylinder head;
   exhaust valves for opening and closing said exhaust ports;
   intake openings formed on the peripheral portion at the lower part of said cylinder liners;
   intake ports formed a the lower part of said cylinder block, and communicating with said intake openings;
   intake valves disposed for opening and closing said intake ports; and
   electromagnetic valve driving devices for opening and closing said exhaust valves and said intake valves by electromagnetic force.

2. A two-cycle heat-insulating engine according to claim 1, wherein exhaust ports per cylinder are formed in said cylinder head and said exhaust valves are disposed at said exhaust ports, respectively.

3. A two-cycle heat-insulating engine according to claim 1, wherein intake ports per cylinder are formed at the lower part of said cylinder block, and said intake valves are disposed at said intake ports, respectively.

4. A two-cycle heat-insulating engine according to claim 1, wherein said intake valve and said exhaust valve are made of a non-magnetic ceramic material.

5. A two-cycle heat-insulating engine according to claim 1, wherein said electromagnetic driving device includes a movable element made of a magnetic material and fixed to the upper end of said valve, a movable element coil for energizing said movable element, a stationary element made of a magnetic material and disposed above said movable element in such a manner as to face said movable element, a stationary element coil for energizing said movable element and a valve spring for returning said movable element.

6. A two-cycle heat-insulating engine comprising:
   a cylinder block;
   cylinder liners, each being fitted into each of cylinders formed in said cylinder block;
   a cylinder head fixed to said cylinder block;
   combustion chambers formed by said cylinder head and said cylinder liners;
   exhaust ports formed in said cylinder head;
   exhaust valves for opening and closing said exhaust ports;
   intake openings formed on the peripheral portion at the lower part of said cylinder liners;
   intake ports formed at the lower part of said cylinder block, and communicating with said intake openings;
   intake valves disposed for opening and closing said intake ports;
   electromagnetic valve driving devices for opening and closing said exhaust valves and said intake valves by electromagnetic force;
   detection means for detecting the operational conditions of said engine; and
   a controller for controlling the opening and closing state of said intake valves and said exhaust valves in response to the detection signals of said detection means.

7. A two-cycle heat-insulating engine according to claim 6, wherein said detection means includes a position sensor for detecting a crank angle, and said controller controls the operational conditions of said intake valves and said exhaust valves in response to the detection signal of said position sensor.

8. A two-cycle heat-insulating engine according to claim 6, wherein said detection means is a rotation sensor for detecting the number of revolution of said engine.

9. A two-cycle heat-insulating engine according to claim 8, wherein said exhaust valve is opened near the lower dead point in response to the detection signal from said rotation sensor representing that said engine is at a low speed revolution to exhaust an exhaust gas.

* * * * *